United States Patent
Weiss

(10) Patent No.: US 7,027,238 B2
(45) Date of Patent: Apr. 11, 2006

(54) METHOD AND APPARATUS FOR COLOR-NEUTRAL BRIGHTNESS REGULATING OF A LIGHT SOURCE

(75) Inventor: Albrecht Weiss, Linden (DE)

(73) Assignee: Leica Microsystems Wetzlar GmbH, Wetzlar (DE)

(*) Notice: Subject to any disclaimer, the term of this patent is extended or adjusted under 35 U.S.C. 154(b) by 0 days.

(21) Appl. No.: 10/173,101

(22) Filed: Jun. 18, 2002

(65) Prior Publication Data

US 2003/0011910 A1    Jan. 16, 2003

(30) Foreign Application Priority Data

Jul. 4, 2001  (DE) ................................ 101 32 360

(51) Int. Cl.
*G02B 5/22* (2006.01)
*F21V 11/00* (2006.01)

(52) U.S. Cl. .................... 359/888; 359/889; 359/385; 362/508; 362/509

(58) Field of Classification Search ................ 359/885, 359/888, 889, 890, 891, 892, 385, 368; 358/55, 358/10; 362/326, 21, 257, 324, 509, 510, 362/508; 353/108

See application file for complete search history.

(56) References Cited

U.S. PATENT DOCUMENTS 4,361,863 A    11/1982  Hagner
4,610,538 A *   9/1986  Takenaka ..................... 355/69
4,682,214 A *   7/1987  Sato et al. .................... 358/55
5,022,744 A *   6/1991  Leiter .......................... 359/385
5,046,834 A     9/1991  Dietrich
5,559,631 A     9/1996  Remer et al.

FOREIGN PATENT DOCUMENTS

| DE | 27 57 543 A1 | 6/1979 |
| DE | 38 14 006 A1 | 11/1989 |
| DE | 39 18 990 A1 | 12/1990 |
| DE | 41 42 925 | 7/1993 |
| DE | 195 13 350 | 10/1995 |
| DE | 198 32 665 | 1/2000 |

OTHER PUBLICATIONS

Patent Abstracts of Japan, JP 2001-083088, Mar. 30, 2001.

* cited by examiner

*Primary Examiner*—Audrey Chang
(74) *Attorney, Agent, or Firm*—Foley & Lardner LLP

(57) ABSTRACT

A method and an apparatus for regulating the brightness of a light source (2), configured as an incandescent lamp, in the illumination beam path (8) of a microscope (1), the brightness of the light source (2) being modifiable by increasing or reducing the electrical power delivered to the light source (2), are characterized in that a red shift, associated with the reduction in the delivered electrical power, of the spectrum of the light emitted by the light source (2) in the illumination beam path (8) is compensated for by way of a variable optical filter (16) that brings about a blue shift of the spectrum. A color-neutral regulation of the brightness of the illuminating light is thereby achieved.

30 Claims, 8 Drawing Sheets

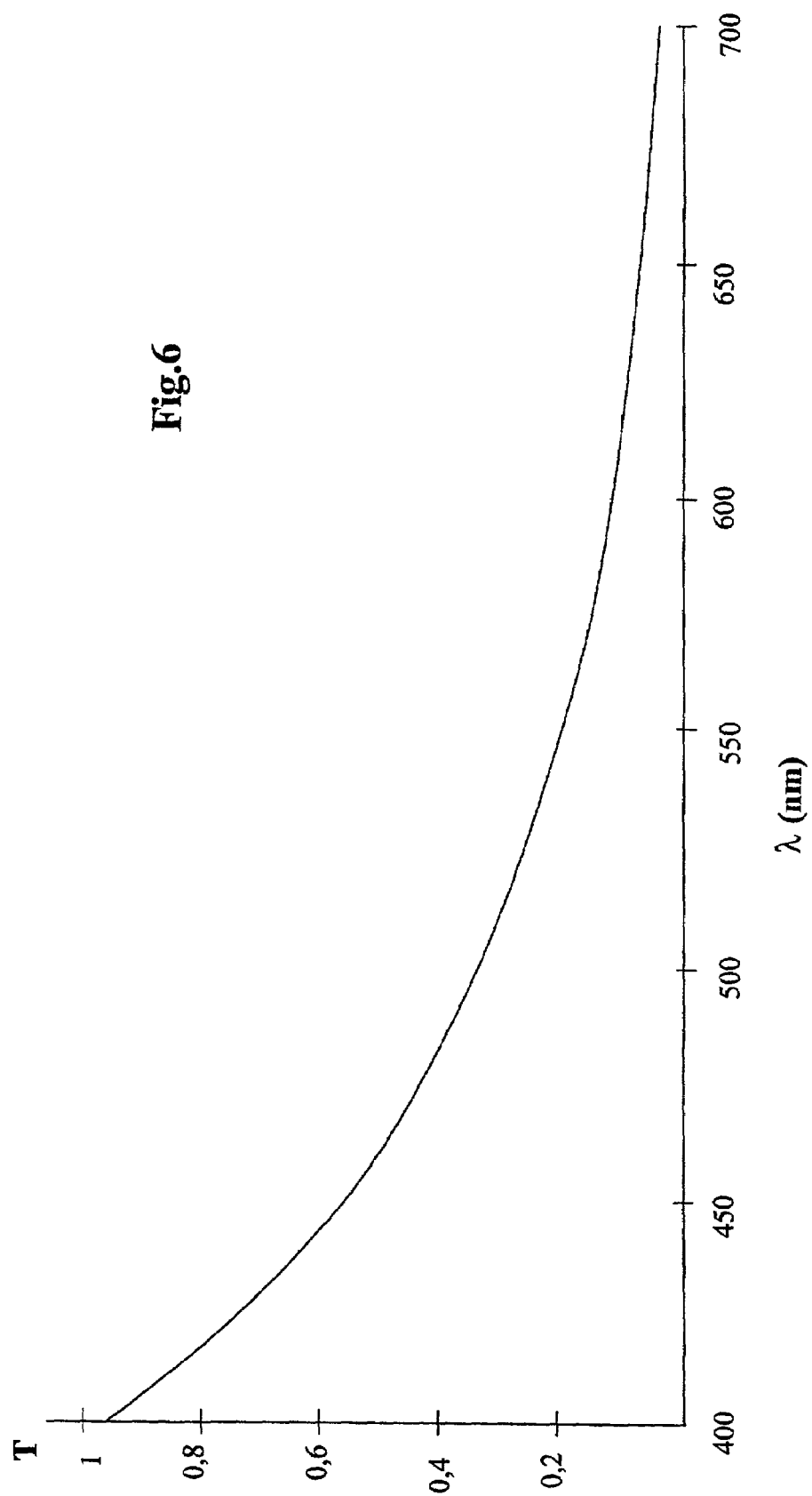

METHOD AND APPARATUS FOR COLOR-NEUTRAL BRIGHTNESS REGULATING OF A LIGHT SOURCE

CROSS REFERENCE TO RELATED APPLICATIONS

This application claims priority of the German patent application 101 32 360.3-42 which is incorporated by reference herein.

FIELD OF THE INVENTION

The invention concerns a method and an apparatus for color-neutral brightness regulating of a light source, in particular in the illumination beam path of a microscope.

BACKGROUND OF THE INVENTION

In optical devices, for example light microscopes, in which a specimen for examination is illuminated by a light source, it is generally desirable if the brightness of the light source is modifiable so that the illumination conditions can be optimally adapted to the type of specimen being examined and the observation method being used (e.g. brightfield, polarization, interference contrast, or phase contrast). Incandescent lamps or halogen lamps are preferably used as the light sources in this context, since they are available from numerous manufacturers in a wide variety of configurations in terms of output, operating voltage, filament shape, service life, and color temperature.

In microscopes that operate with an incandescent lamp as the light source, the brightness of the light source is usually modified by the fact that the electrical power delivered to the light source is increased or lowered by way of a corresponding reduction in the electrical voltage or electrical current delivered to the incandescent lamp.

Because the behavior of incandescent lamps is similar to that of a black body, there exists in the context of this type of brightness modification the problem that upon a reduction in the delivered lamp power, the color temperature of the spectrum emitted by the incandescent lamp shifts out of the blue spectral region toward the red spectral region; this is generally also referred to as a "red shift" and as a rule is considered disadvantageous in microscopes. For example, a reduction from 100% to 80% of the rated voltage in the voltage applied to an incandescent lamp results not only in a reduction in light flux of approximately 50% but also, in similar fashion, in a lowering of the color temperature T from 3200 K to 2950 K.

DE 41 42 925 A1 discloses a method and an apparatus for color-neutral brightness regulation of an illumination system for a microscope in which the brightness is set to a desired value by way of the electrical current delivered to a main light source, and the change in color temperature associated therewith is simultaneously compensated for by means of a corresponding regulation of the lamp current of a secondary light source (in a second lamp housing) having a suitable downstream optical filter which has a fixed transmittance. Although heating of the stand is decreased, in the apparatus described, by the arrangement of the secondary light source outside the microscope stand, in this apparatus all the dissipated power of an incandescent bulb occurs as heat.

DE 195 13 350 A1 describes a filter that comprises an opaque filter disk having openings of different sizes in various regions of the filter disk. Because of the different sizes of the openings, the filter has a different transmission in the various regions of the filter disk, so that by rotation of the filter disk introduced into the illumination beam path of an optical instrument, the brightness of an incandescent lamp can be modified in color-neutral fashion. For color-neutral brightness regulation, however, the incandescent lamp must also always be operated in the vicinity of the rated voltage, once again resulting in undesired heating of the stand and the filter disk and in a shorter service life for the incandescent lamp (as compared to operation at less than the rated output).

In addition, DE 198 32 665 A1 describes a homogenization filter for an optical radiation field of an illumination beam path that, in coaction with a diffusion disk, results in a homogenization of the light intensity in a downstream image plane. The homogenization filter comprises a transparent substrate onto which a grid of opaque planar elements is applied by evaporative deposition, by means of a perforated stencil arranged in front of the substrate or a perforated layer applied onto the substrate in a photolithographic procedure.

SUMMARY OF THE INVENTION

It is an object of the present invention to provide a method and an apparatus which make it possible to regulate the brightness of an incandescent lamp, while maintaining the color temperature and providing a low heat generation.

This object is achieved, according to the invention, by a method for regulating the brightness of a light source, in particular in the illumination beam path of a microscope, comprising the following steps:
modifying the brightness of the light source by increasing or reducing the electrical power delivered to the light source,
thereby causing a red shift, associated with the reduction in the delivered electrical power, of the spectrum of the light emitted by the light source in the illumination beam path,
compensating said red shift of the spectrum by way of a variable optical filter that brings about a blue shift of the spectrum, whereby the amount of the blue shift is adapted to compensate the red shift.

This object is also achieved, according to the invention, by an apparatus for color-neutral brightness regulation of a light source in the illumination beam path of an optical device, in particular a microscope, comprising:
means for modifying the brightness of said light source by increasing or reducing the electrical power delivered to said light source,
an optical filter placed in the illumination beam path having a transmittance (T) for red light that changes across the filter surface, thereby causing a defined blue shift of the spectrum,
at least one drive system for moving said filter in the illuminating beam path,
and a control device which controls said drive system to move said filter in such a way that a red shift of the spectrum of the light emitted by the light source occurring upon a reduction in the electrical power delivered to the light source is compensated for by way of said blue shift caused by said filter.

Further features of the invention are contained in the dependent claims.

According to the invention, in the method for color-neutral regulation of the brightness of a light source constituted by an incandescent lamp which serves, in particular in the illumination beam path of a microscope, to illuminate the preparation being examined, the brightness of the light source is modified by increasing or reducing the electrical voltage applied to the incandescent lamp or the electrical current flowing through the incandescent lamp. The red shift of the spectrum, or decrease in color temperature, associated with the reduction of the brightness is compensated for, substantially simultaneously or a short time after the lowering of the brightness, by way of a variable optical filter that brings about an additional blue shift of the spectrum and is introduced into the illumination beam path of the optical device. The variable optical filter, which according to the present invention is configured as a blue filter, in particular reduces the red light component in the spectrum emitted by the incandescent lamp, in such a way that the ratio of the red component to the blue component of the spectrum is substantially identical at the reduced brightness value and at the original brightness value, so that the viewer's eye perceives substantially the same color temperature.

When the brightness of the incandescent lamp is increased, the red component of the spectrum is increased in correspondingly converse fashion by adjusting the optical filter in such a way that the ratio of red component to blue component of the spectrum once again assumes the original value with no accompanying change in color temperature.

This results in the advantage that the incandescent lamp can be operated with a reduction in brightness at less than its rated output, so that the service life of the lamp can be considerably increased and the heat evolution and energy consumption of the lamp can be greatly reduced. In particular, the method according to the present invention appreciably diminishes the heating of the optical device or its parts, in particular of the stand in the context of use in a microscope, that is often regarded as troublesome. A further advantage is the fact that a second lamp housing with a secondary light source, as known from the existing art, can be dispensed with. The manner in which the present invention achieves its object is thus particular economical.

The filter preferably possesses a transmittance, in particular for red light, that changes across the filter surface. Compensation for the red shift of the spectrum upon a reduction in the delivered electrical power is accomplished, according to the present invention, by way of a modification in the position of the filter in the illumination beam path. In the simplest case, the position of the filter can be modified manually. In the preferred embodiment of the invention, however, upon an adjustment in brightness the position of the filter in the illumination beam path is automatically modified by way of a drive system acting on the filter, so that the operator of the optical instrument needs only to set the desired brightness, without displacing the filter by hand to adjust the color temperature to the original value.

According to a first embodiment of the invention, the filter can be constituted by a preferably circular filter disk which is rotatable about a rotation axis and whose transmittance (i.e. the proportion of light passing through the filter relative to the incident light quantity), in particular for red light, increases along a path extending substantially concentrically with the rotation axis. This results on the one hand in a very compact configuration of the associated apparatus, and in the possibility of driving the filter disk directly via an economical motor, e.g. a stepping motor, by mounting the filter disk directly on the drive shaft of the motor.

In the same way, however, it is also possible to effect driving of the filter disk via a gear drive or a toothed belt; as a result, positioning accuracy is improved and the motor can be positioned at a greater distance from the illuminating beam path.

In this embodiment of the invention utilizing a circular filter disk, the transmittance for red light increases along the concentrically extending path, preferably continuously, from a minimum value to a maximum value, thereby advantageously yielding the possibility of stepless color-neutral regulation of the brightness of the incandescent lamp.

Similarly, however, it is also conceivable for the transmittance for red light to increase in steps from the minimum value to the maximum value, so that manufacture of the filter disk can be simplified and control complexity can be reduced.

It is furthermore possible for the filter to be constituted by a linearly displaceable, for example rectangularly configured filter that exhibits a transmittance, in particular for red light, which increases along a path extending substantially parallel to the displacement direction and which increases along the path from a minimum value to a maximum value substantially continuously or, as described above in conjunction with the circular filter disk, in steps. The use of an elongated rectangular filter yields the advantage that it can be produced in particularly more economical fashion, since the transmittance of the respective planar elements in the direction perpendicular to the motion direction is constant, so that the rectangular filter can easily be manufactured, for example, by moving it at variable speed past a source that applies an interference coating or reflective coating.

In the case of the circular filter, on the other hand, the fact that the extent of the planar elements increases out from the center must also be taken into account, so that the concentric path having a variable, increasing transmittance is preferably arranged in the region of the exterior of the filter disk; as a result, compared to a radially inward arrangement of the concentration path, upon application of an interference coating or reflective coating in the manner described above, circumferential rotation of the filter disk yields a substantially homogeneous profile of the layer when considered in the radial direction.

According to a further embodiment of the invention, the filter is configured as an absorption filter, and the modification of the filter's transmittance for red light across the filter surface is accomplished by way of a variation in the thickness of the filter. For that purpose, in the case of the disk-shaped filter, the thickness of the absorbent medium can increase in the circumferential direction preferably continuously, from a minimum value of e.g. 0.1 to 0.5 mm to a maximum value of e.g. 1.5 to 2 mm or more. In the case of the rectangular embodiment of the filter, the thickness change can be brought about by the fact that it is configured as a wedge, for example ground from a filter medium such as glass or plastic having the characteristic of absorbing red light, or manufactured in some other way.

In similar fashion, it is possible to fabricate the filter medium from a plastic material having a substantially constant thickness which is equipped during manufacture, by the introduction of suitable additives, with a coloration which absorbs or reflects red light and which, preferably continuously, increases from an uncolored region to a region with maximum coloration, in the case of the circular filter in the circumferential direction and with the rectangularly configured filter preferably in the direction of the displacement travel.

The possibility furthermore exists of configuring the filter as a reflection filter which reflects or attenuates, in particular, the red component in the spectrum via an interference layer or reflective layer applied onto the exterior of the filter, and in which only the short-wavelength blue component of the spectrum passes through the filter almost without attenuation. In this context, the modification of the filter's transmittance for red light across the filter surface is advantageously attained by varying the surface coverage of the applied interference layer or reflection layer; this can be achieved, for example, by way of a dot pattern having dots of increasing size or increasing density in terms of area, which can be applied e.g. in a known lithographic procedure onto a filter medium or substrate, for example glass, that is transparent to both red and blue light.

In addition, the use of an interference filter layer applied as a dot pattern with variable coverage yields comparatively high dynamics and a wide regulation range for the brightness. In the context of an incandescent lamp with a rated output of 100 W, for example, by reducing the lamp current from 8 A to 4 A and simultaneously introducing a filter layer having a coverage of 95%, it is possible to reduce the light intensity from 100% to 0.2% while maintaining the color temperature.

In the preferred embodiment of the invention, the position of the filter in the illumination beam path is modified preferably in motorized fashion via a stepping motor that, by means of a suitable control device and as a function of an incandescent lamp brightness value selected by the operator, rotates or linearly displaces the filter disk in the illumination beam path in such a way that the color temperature of the illuminating light directed onto the preparation is kept substantially constant. The advantage resulting therefrom is that after a modification in brightness by way of a corresponding current/voltage change, the operator does not need to readjust the color temperature manually by moving the filter disk.

The control device preferably comprises a memory in which the values for the electrical current delivered to the light source and/or the electrical voltage delivered to the light source, together with the pertinent values for the position of the filter in the illumination beam path, are saved and can be read out by the control device for adjustment to a new brightness value. The respective values for the current or voltage and for the pertinent position of the filter disk in the illumination beam path are preferably determined by a calibration operation; for this, proceeding for example from the current/voltage value for the maximum brightness of the incandescent lamp, the filter disk is moved into a position with maximum transmittance, in which both the red and the blue component of the spectrum emitted by the incandescent lamp pass through the filter. Once the pertinent values for current/voltage and the position of the filter disk have been saved, the brightness of the incandescent lamp is reduced and the position of the filter disk is moved by raising or lowering the associated value for the position, while measuring the color temperature, until the original color temperature value is once again reached. The pertinent values for the brightness and the current/voltage are stored in the memory.

The brightness is then once again reduced in steps and the respective pertinent position of the filter disk is determined and saved in the manner described above, until the position in which the filter disk exhibits its minimum transmittance is reached.

According to the present invention, an apparatus for color-neutral regulation of the brightness of an incandescent lamp in the illumination beam path of a microscope comprises a variable optical blue filter, having a transmittance that changes across the filter surface, that can be moved in the illumination beam path by means of a drive system. The drive system, which preferably is configured as a stepping motor, is connected to an electronic control device that controls the drive system to move the filter in such a way that the red shift of the spectrum emitted by the incandescent light that occurs upon a decrease in the electrical power delivered to the incandescent lamp is compensated for by a blue shift. The apparatus has the advantage that it can easily be installed in known microscopes and thus makes possible economical automation of the devices.

A further advantage of the apparatus according to the present invention is the fact that the maximum achievable intensity of the light is not affected.

The filter is preferably constituted by a filter disk, rotatable about a rotation axis by means of the drive system, that has a transmittance for red light which increases along a path extending substantially concentrically to the rotation axis.

The filter with variable transmittance for red light can, however, also be constituted in similar fashion by a filter that is linearly displaceable by means of the drive system and has a transmittance for red light which increases along a path extending substantially parallel to the displacement direction.

The filter can be configured as an absorption filter, fabricated from plastic, glass, or another suitable material, which is transparent to blue light and at least partially absorbs red light, and in which the modification in the filter's transmittance for red light across the filter surface is achieved by a variation in the thickness of the filter.

Similarly, the filter used in the apparatus according to the present invention can be configured as a reflection filter that possesses a filter body made of a material transparent to both red and blue light, on which is applied an interference filter layer, in the form of a dot pattern, that reflects or absorbs red light. In this embodiment of the apparatus according to the present invention, the variation in the transmittance for red light is achieved by way of a pattern dot surface coverage that changes across the filter surface, or a variation in the size or shape of the pattern dots, which can be applied onto the filter surface of the filter body in known fashion, e.g. in a lithography process followed by evaporative deposition.

The interference filter layer has, for example, a spectral profile with the following values for transmittance (hereinafter generally referred to as "T"):

$T=75\%$ at a wavelength $\lambda=425$ nm;

$T=17\%$ at a wavelength $\lambda=550$ nm; and $T=5\%$ at $\lambda=650$ nm.

With this embodiment of the apparatus according to the present invention, in order to prevent a change in the intensity of the light emitted by the incandescent lamp across the illuminated preparation caused by the change in the surface coverage of the reflective layer or interference layer, the filter is preferably arranged close to an aperture stop provided in the illumination beam path of the microscope.

BRIEF DESCRIPTION OF THE DRAWINGS

The invention will be described below with reference to the drawings and on the basis of examples.

In the drawings:

FIG. 6 shows the spectral profile of the transmittance T of an interference filter layer, utilized in the apparatus according to the present invention, that is applied onto the filter surface in the form of a dot pattern with variable coverage.

DETAILED DESCRIPTION OF THE INVENTION

Figure 1:
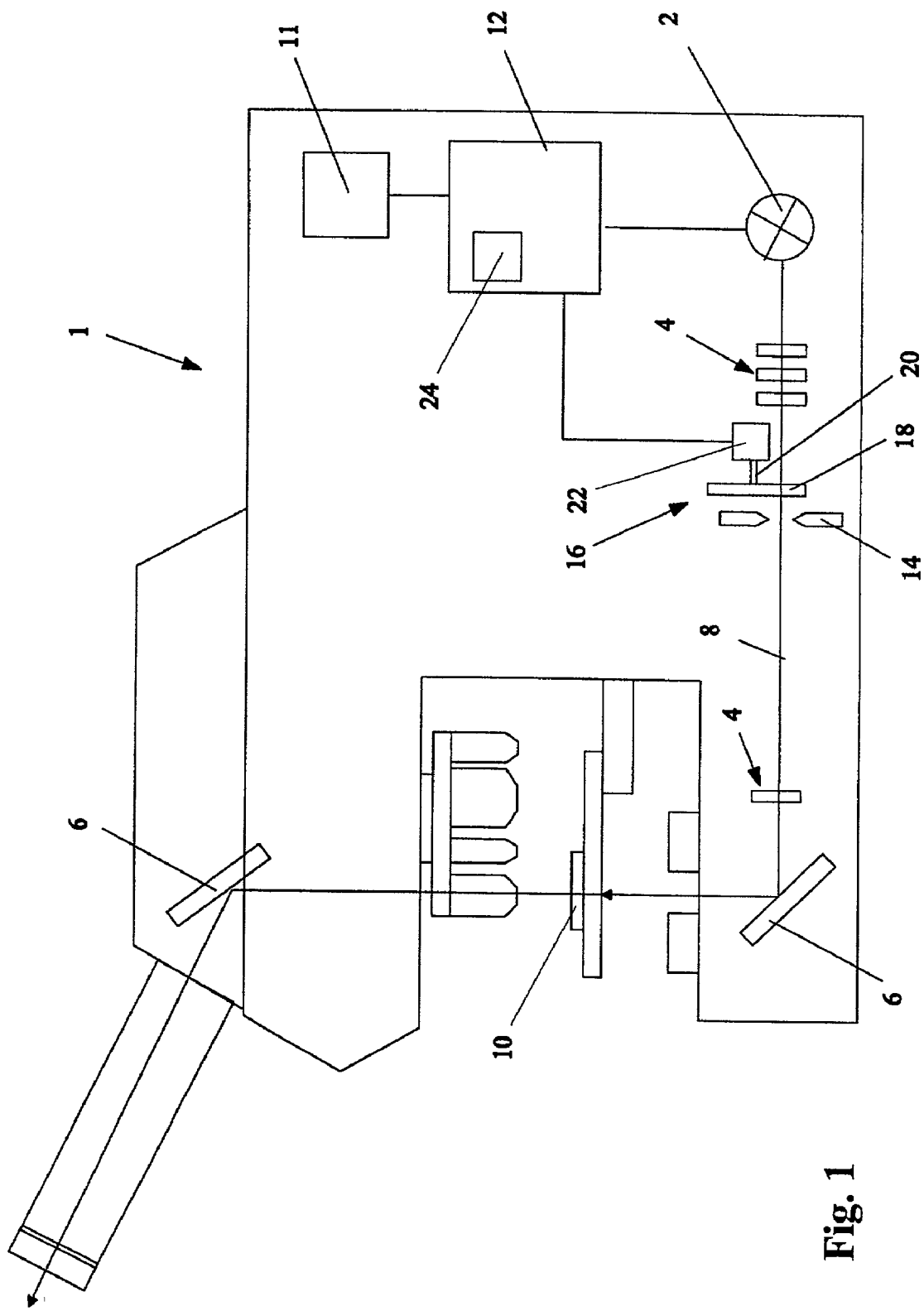
FIG. 1 schematically depicts a microscope having an apparatus according to the present invention for regulating the brightness of the light source used in the microscope.

Microscope 1 depicted in FIG. 1 contains a light source 2 in the form of an incandescent lamp, whose light is guided via a system of lenses 4 and mirrors 6 along an illumination beam path 8 to illuminate a preparation 10 that is to be examined.

Light source 2 is electrically connected to a control device 12 which controls the electrical power delivered to light source 2 from a current source 11, in order to adjust the brightness of light source 2 to a desired value that can be defined by the operator via an adjustment apparatus (not depicted) connected to control device 12.

Arranged in illumination beam path 8 in the region of an aperture stop 14 is an optical filter 16 according to the present invention, having a variable transmittance for red light, which is constituted by a substantially circular filter disk 18. Filter disk 18 is joined to drive shaft 20 of an electric stepping motor 22 controlled by control device 12 which, upon a modification of the brightness of light source 2, rotates filter disk 18 into a position in which a region of filter disk 18 having a transmittance compensating for the red shift of the spectrum is arranged in illumination beam path 8. The respective position values of filter disk 18 and the pertinent values for the current or voltage delivered to light source 2 are stored in a memory 24 of control device 12.

Figure 2A:
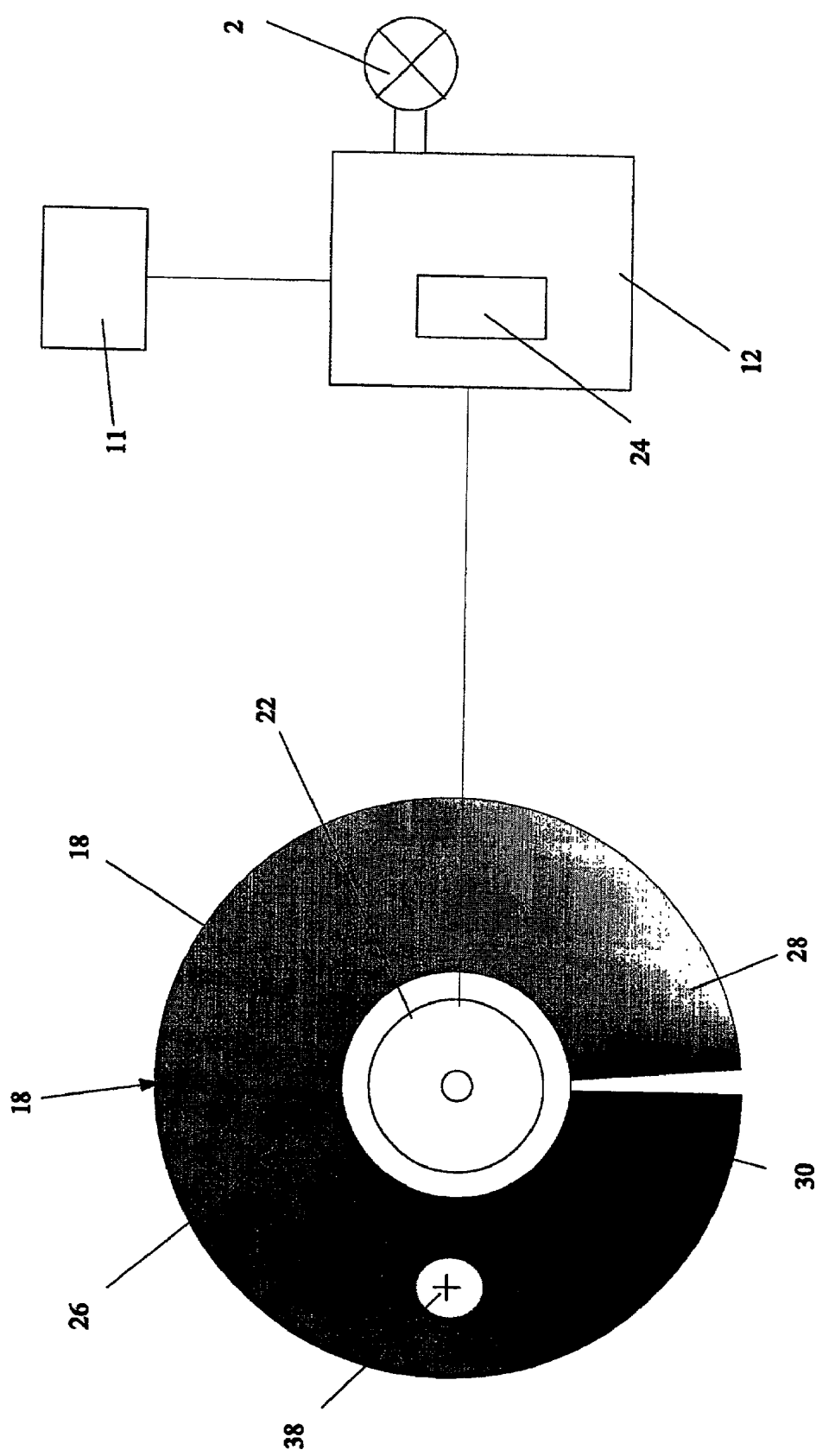
FIG. 2a schematically depicts the apparatus according to the present invention in which the filter is constituted by a circular filter disk having an interference layer or reflective layer, applied onto it as a dot pattern, that exhibits a continuously increasing surface coverage.

As may be gathered from the depiction of FIG. 2a, the variable transmittance of optical filter 16 for red light is achieved by way of a varying coverage of the filter disk's surface with a reflective layer or interference layer 26, which for reasons of illustrative technique is depicted only schematically in the Figures, and which increases substantially continuously in the circumferential direction from a minimum value 28 with no coverage to a maximum value 30 with complete or almost complete coverage. Light spot 38 produced on optical filter 16 by the light beam of light source 2 is indicated schematically in FIGS. 2a through 3b by a circle having a cross placed within it.

Figure 2B:
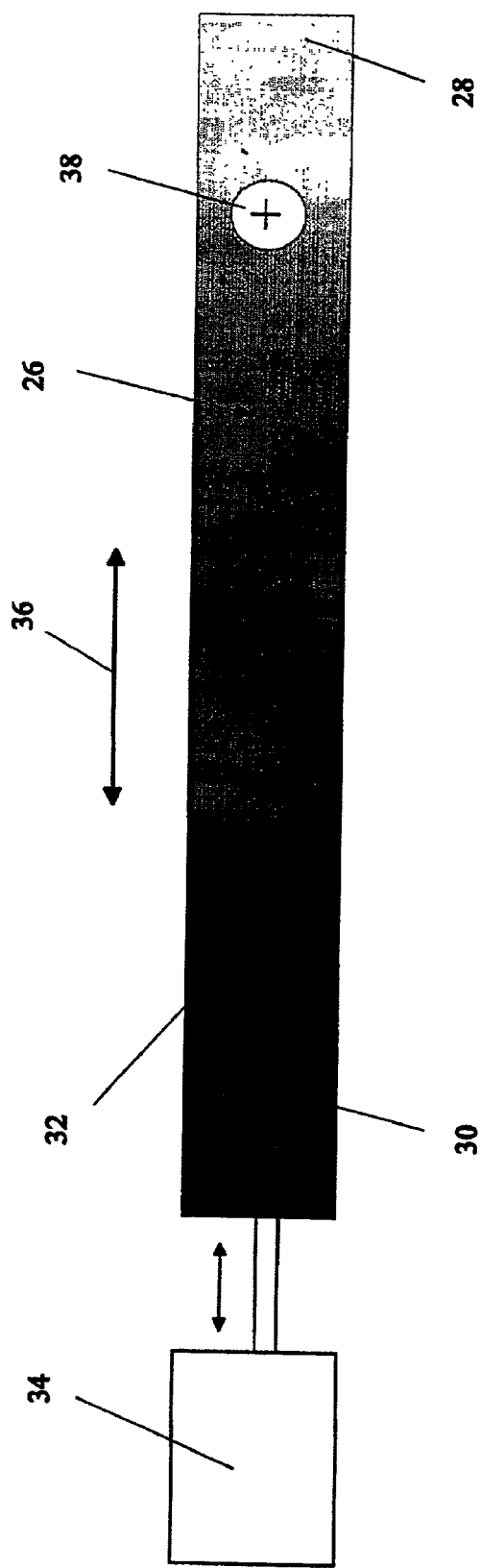
FIG. 2b schematically depicts the apparatus according to the present invention in which the filter is constituted by a rectangular filter having an interference layer or reflective layer, applied onto it as a dot pattern, that exhibits a continuously increasing surface coverage.

As is evident from FIG. 2b, according to a further embodiment of the invention optical filter 16 is constituted by a substantially rectangular filter 32 that is also coated with a reflective layer or interference layer 26. The filter is moved linearly in the direction of double arrow 36 by means of a spindle drive system 34. In the same way as with the embodiment of FIG. 2a, the surface coverage of the reflective layer or interference layer 26 increases substantially continuously from a minimum value 28 to a maximum value 30.

Figure 3A:
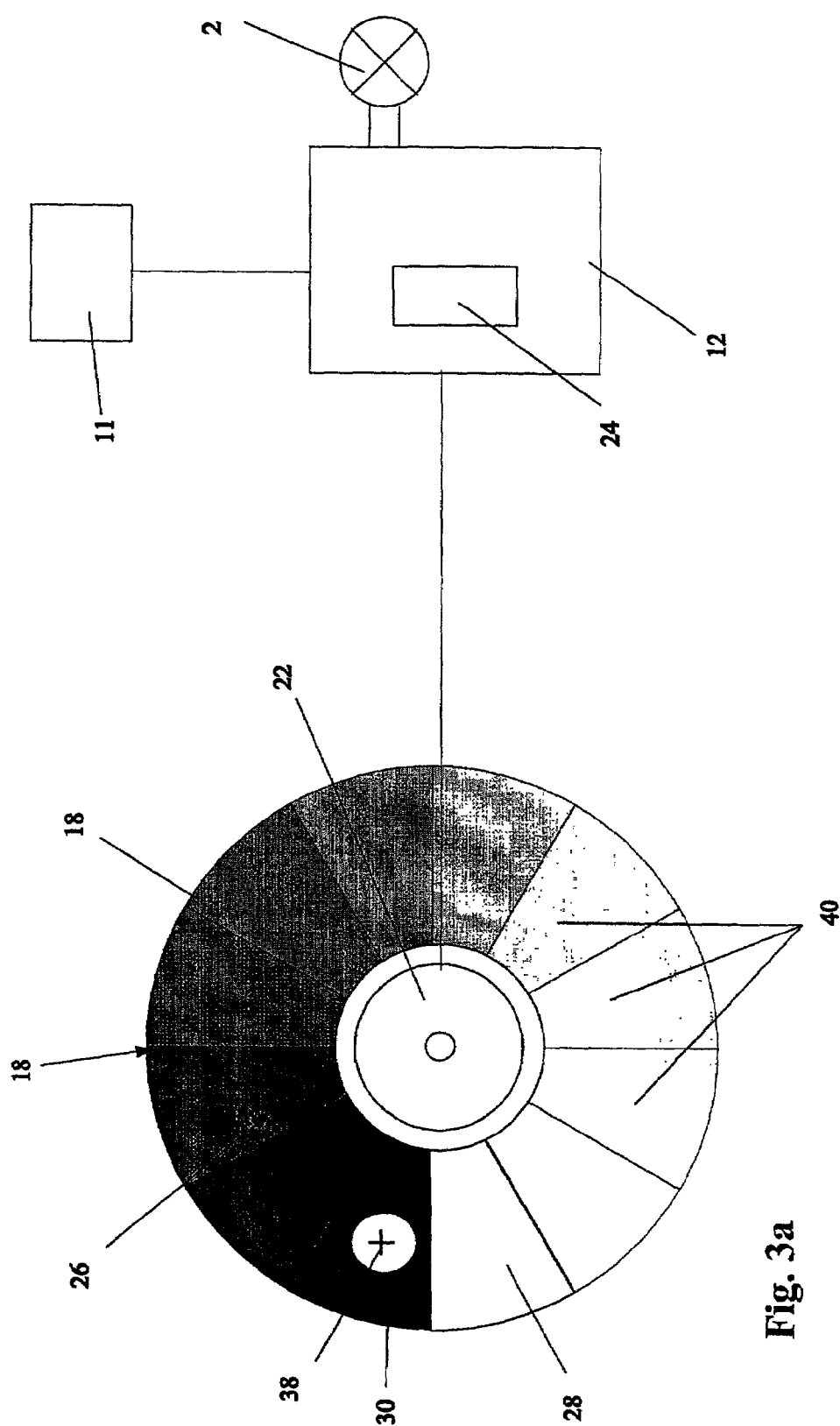
FIG. 3a schematically depicts the apparatus according to the present invention in which the filter is constituted by a circular filter disk having an interference layer or reflective layer, applied onto it as a dot pattern, that exhibits a surface coverage increasing in steps.
Figure 3B:
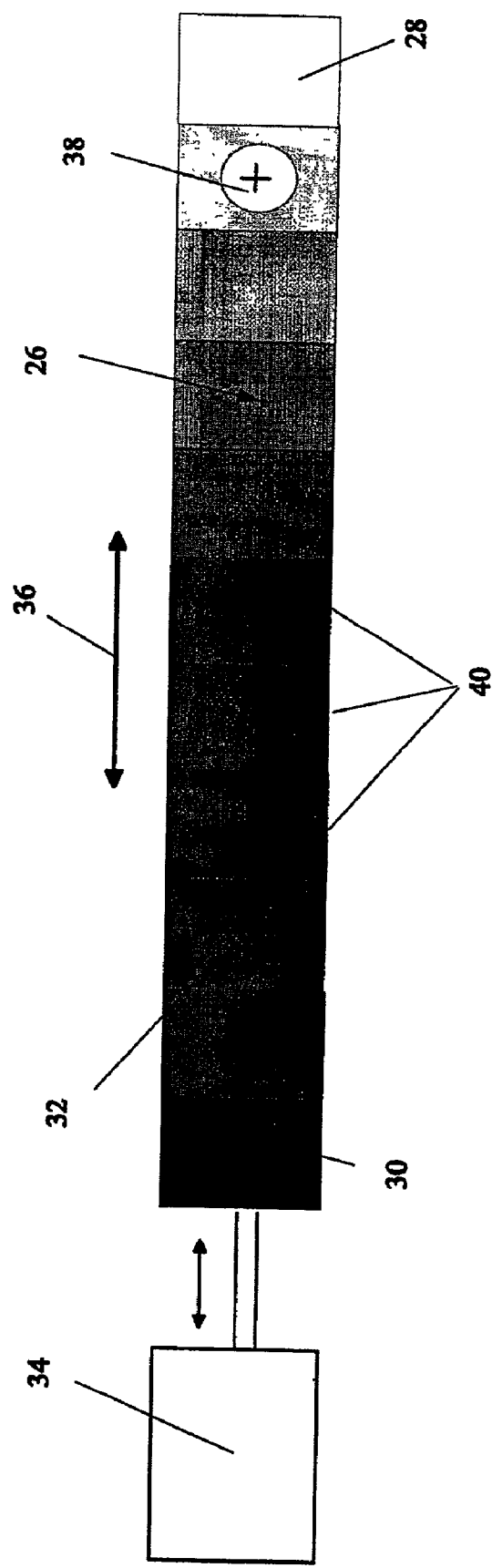
FIG. 3b schematically depicts the apparatus according to the present invention in which the filter is constituted by a rectangular filter having an interference layer or reflective layer, applied onto it as a dot pattern, that exhibits a surface coverage increasing in steps.

According to a further embodiment of the invention shown in FIGS. 3a and 3b, the density of the reflective layer or interference layer 26 increases in steps over the circumference of circular filter disk 18 and in the direction of the displacement travel of rectangular filter panel 32, as expressed in the relevant Figures by segments 40 having a substantially constant surface coverage.

Figure 4A:
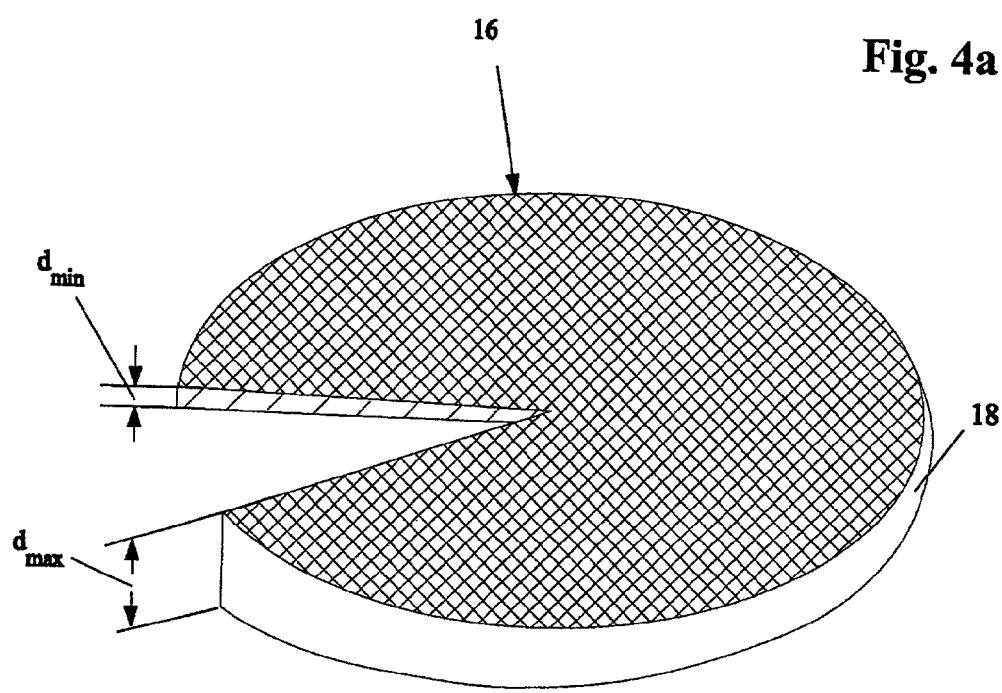
FIG. 4a schematically depicts the apparatus according to the present invention in which the filter is configured as an absorption filter having a circular filter disk of increasing thickness.
Figure 4B:
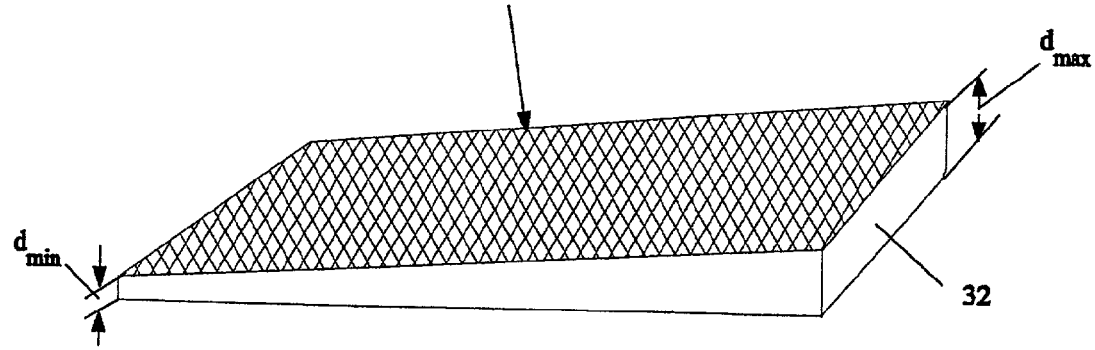
FIG. 4b schematically depicts the apparatus according to the present invention in which the filter is configured as an absorption filter having a rectangular filter panel of increasing thickness.

As shown in FIGS. 4a and 4b, in a further embodiment of the invention optical filter 16 is configured as an absorption filter in which the variation in transmittance is achieved by modifying the thickness of the filter disk, which is fabricated from a material that is partially transparent to red light. There is thus a substantially continuous increase, from a minimum valve $d_{min}$ to a maximum value $d_{max}$, in the thickness of filter disk 18 in the circumferential direction (in the embodiment of the invention shown in FIG. 4a) and in the thickness of the rectangular, wedge-shaped filter panel 32 in the direction of the displacement (in the embodiment shown in FIG. 4b). At maximum brightness, the thin region of filter disk and panel 18, 32 is introduced into the illumination beam path, and with increasing reduction in brightness, filter disk and panel 18, 32 are moved in the direction of the region of greater thickness. The minimum thickness value $d_{min}$ can lie, for example, in the range from 0.1 mm to 0.5 mm, and the maximum value $d_{max}$ can lie in the range from e.g. 1.5 to 2 mm; the actual values are to be selected as a function of the absorption filter material used and the brightness of light source 2 at the rated voltage.

Figure 5:
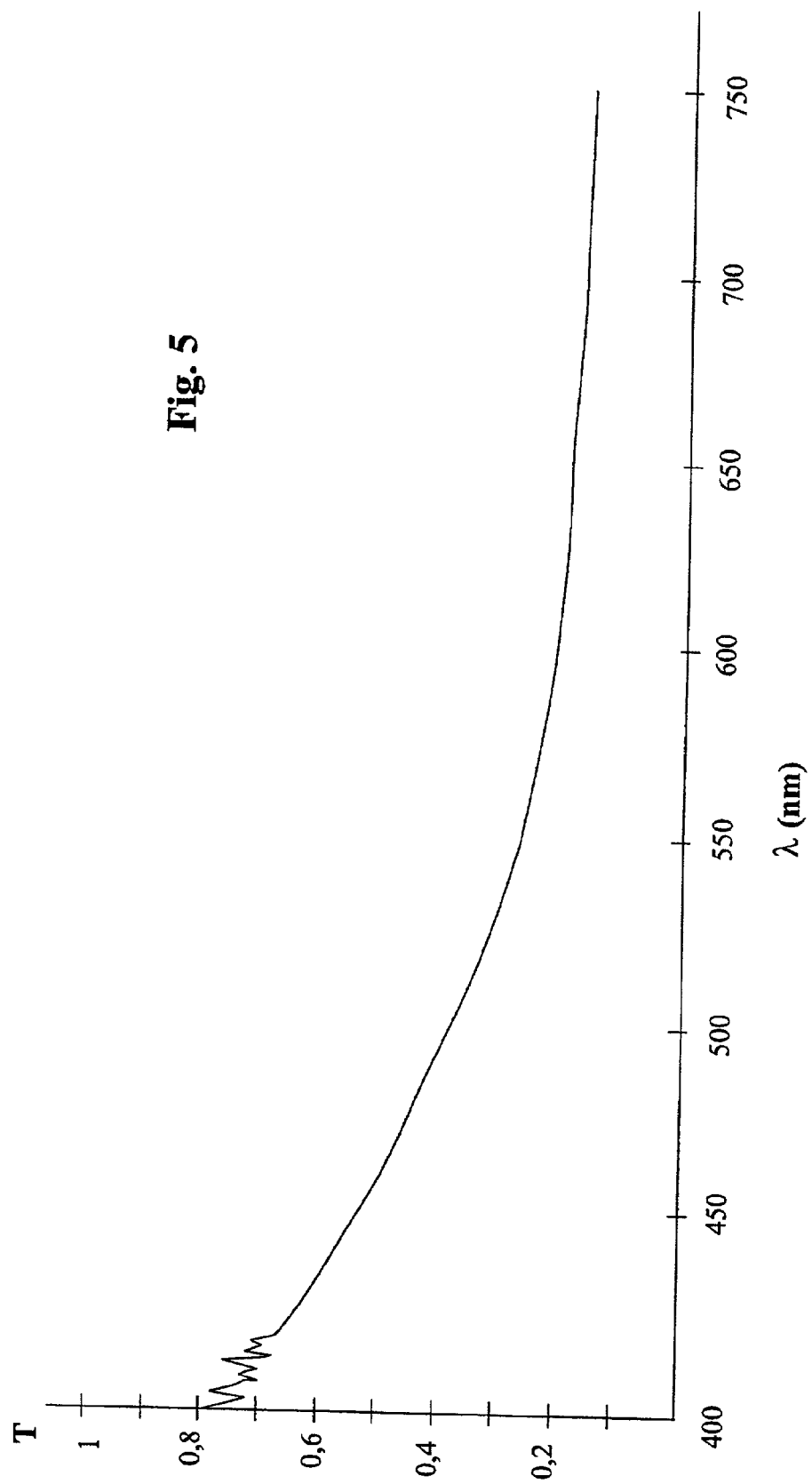
FIG. 5 shows the spectral profile of the transmittance T of an absorption filter, utilized in the apparatus according to the present invention, at a thickness of 1 mm.

FIG. 5 illustrates the spectral profile of the transmittance T of an absorption filter material, utilized in the apparatus according to the present invention, at a thickness of 1 mm as utilized in the filters according to FIGS. 4a and 4b.

FIG. 6 shows the spectral profile of the transmittance T of an interference layer 26, utilized in an apparatus according to the present invention, that is applied in the form of a dot pattern with variable coverage onto the filter surface of the filters according to FIGS. 2a through 3b.

The invention has been described in detail with particular reference to certain preferred embodiments thereof, but it will be understood that variations and modifications can be effected within the spirit and scope of the invention.

PARTS LIST

1 Microscope
2 Light source
4 Lenses
6 Mirrors
8 Illumination beam path

-continued

PARTS LIST

10 Preparation
11 Current source
12 Control device
14 Aperture stop
16 Optical filter
18 Filter disk
20 Drive shaft
22 Stepping motor
24 Memory
26 Interference layer
28 Minimum value
30 Maximum value
32 Rectangular filter
34 Spindle drive system
36 Double arrow
38 Light spot
40 Segments.

$d_{min}$ Minimum value for thickness
$d_{max}$ Maximum value for thickness

What is claimed is:

1. A method for color-neutral brightness regulating of a light source in an illumination beam path of a microscope, comprising the following steps:
   modifying the brightness of said light source by increasing or reducing electrical power delivered to said light source, thereby causing a red shift, associated with the reduction in the delivered electrical power, of the spectrum of the light emitted by said light source in said illumination beam path of said microscope; and
   compensating said red shift of the spectrum by way of a variable optical filter that brings about a blue shift of the spectrum, whereby the amount of said blue shift is adapted to compensate said red shift.

2. The method as defined in claim 1, wherein said filter has a transmittance for red light that changes across the filter surface; and
   compensation for the red shift upon a reduction in the delivered electrical power is accomplished by way of a modification in a position of said filter in the illumination beam path.

3. The method as defined in claim 2, wherein the filter is constituted by a filter disk that is rotatable about a rotation axis and has a transmittance for red light that increases along a path extending substantially concentrically with the rotation axis.

4. The method as defined in claim 3, wherein the transmittance for red light increases continuously along the concentrically extending path from a minimum value to a maximum value.

5. The method as defined in claim 3, wherein the transmittance for red light increases in steps along the concentrically extending path from a minimum value to a maximum value.

6. The method as defined in claim 3, further comprising:
   modifying of the positioning of said filter in the illumination beam path by at least one drive system; and
   controlling said at least one drive system by use of a control device which, as a function of a selected brightness value of the light source, controls said at least one drive system in order to modify the position of the filter in the illumination beam path in such a way that the amount of said blue shift is adapted to compensate said red shift, whereby a color temperature of light at an end of the illuminating beam path is kept substantially constant.

7. The method as defined in claim 2, wherein said filter is constituted by a linearly displaceable filter panel that exhibits a transmittance for red light which increases along a path extending substantially parallel to the displacement direction.

8. The method as defined in claim 7, wherein the transmittance for red light increases substantially continuously along the path extending substantially parallel to the displacement direction from a minimum value to a maximum value.

9. The method as defined in claim 7, wherein the transmittance for red light increases substantially in steps along the path extending substantially parallel to the displacement direction from a minimum value to a maximum value.

10. The method as defined in claim 7, further comprising:
    modifying of the positioning of said filter in the illumination beam path by at least one drive system; and
    controlling said at least one drive system by use of a control device which, as a function of a selected brightness value of the light source, controls said at least one drive system in order to modify the position of the filter in the illumination beam path in such a way that the amount of said blue shift is adapted to compensate said red shift, whereby a color temperature of light at an end of the illuminating beam path is kept substantially constant.

11. The method as defined in claim 1, further comprising:
    modifying of the positioning of said filter in the illumination beam path by at least one drive system; and
    controlling said at least one drive system by use of a control device which, as a function of a selected brightness value of the light source, controls said at least one drive system in order to modify the position of the filter in the illumination beam path in such a way that the amount of said blue shift is adapted to compensate said red shift, whereby a color temperature of light at an end of the illuminating beam path is kept substantially constant.

12. The method as defined in claim 11, further comprising providing said control device, wherein said control device comprises a memory from which values for at least one of electrical current delivered to the light source and electrical voltage delivered to the light source, together with pertinent values for a position of said filter in the illumination beam path, can be read out for adjustment to a new brightness value.

13. The method as defined in claim 1, wherein said step of compensating comprises compensating said red shift of the spectrum by way of a single variable optical filter that brings about a blue shift of the spectrum, whereby the amount of said blue shift is adapted to compensate said red shift.

14. An apparatus for color-neutral brightness regulation of a light source in an illumination beam path of a microscope, comprising:
    means for modifying the brightness of said light source in the illumination beam path of the microscope by increasing or reducing electrical power delivered to said light source;
    an optical filter placed in the illumination beam path of the microscope and having a transmittance (T) for red light that changes across a filter surface, thereby causing a defined blue shift of a spectrum of light emitted by the light source;
    a drive system for moving said filter in the illuminating beam path;

and a control device which controls said drive system to move said filter in such a way that a red shift of the spectrum of the light emitted by the light source occurring upon a reduction in the electrical power delivered to the light source is compensated for by way of said blue shift caused by said filter.

15. The apparatus as defined in claim 14, wherein said control device comprises a memory from which values for at least one of electrical current delivered to said light source and electrical voltage delivered to said light source, together with pertinent values for a position of said filter in the illumination beam path, can be read out for adjustment to a new brightness value.

16. The apparatus as defined in claim 15, wherein the filter is an absorption filter; and the modification in the transmittance (T) of the filter for red light across the filter surface is accomplished by way of a variation in the thickness of the filter.

17. The apparatus as defined in claim 15, wherein said filter is a filter having at least one of an interference layer and reflection layer; and the modification of the filter's transmittance (T) for red light across the filter surface is accomplished by way of a variation in a surface coverage of said at least one of the interference layer and reflection layer, applied onto the filter surface as a dot pattern in a lithography process followed by evaporative deposition.

18. The apparatus as defined in claim 14, wherein said filter is arranged close to an aperture stop provided in said illumination beam path.

19. The apparatus as defined in claim 18, wherein said filter is an absorption filter; and the modification in the transmittance (T) of said filter for red light across the filter surface is accomplished by way of a variation in the thickness of the filter.

20. The apparatus as defined in claim 18, wherein said filter is a filter having at least one of an interference layer and reflection layer; and the modification of the filter's transmittance (T) for red light across the filter surface is accomplished by way of a variation in a surface coverage of said at least one of the interference layer and reflection layer, applied onto the filter surface as a dot pattern in a lithography process followed by evaporative deposition.

21. The apparatus as defined in claim 14, wherein said filter is constituted by a filter disk, rotatable about a rotation axis by means of the drive system, that has a transmittance (T) for red light which increases along a path extending substantially concentrically to the rotation axis.

22. The apparatus as defined in claim 21, wherein said filter is an absorption filter; and the modification in the transmittance (T) of said filter for red light across the filter surface is accomplished by way of a variation in the thickness of the filter.

23. The apparatus as defined in claim 21, wherein said filter is a filter having at least one of an interference layer and reflection layer; and the modification of the filter's transmittance (T) for red light across the filter surface is accomplished by way of a variation in a surface coverage of said at least one of the interference layer and reflection layer, applied onto the filter surface as a dot pattern in a lithography process followed by evaporative deposition.

24. The apparatus as defined in claim 14, wherein said filter is constituted by a filter that is linearly displaceable in a displacement direction by said drive system and has a transmittance (T) for red light which increases along a path extending substantially parallel to the displacement direction.

25. The apparatus as defined in claim 24, wherein said filter is an absorption filter; and the modification in the transmittance (T) of said filter for red light across the filter surface is accomplished by way of a variation in the thickness of the filter.

26. The apparatus as defined in claim 24, wherein said filter is a filter having at least one of an interference layer and reflection layer; and the modification of the filter's transmittance (T) for red light across the filter surface is accomplished by way of a variation in a surface coverage of said at least one of the interference layer and reflection layer, applied onto the filter surface as a dot pattern in a lithography process followed by evaporative deposition.

27. The apparatus as defined in claim 26, wherein the interference layer has substantially a spectral profile with the following values for the transmittance (T):

$$T = 75\% \text{ at a wavelength } \lambda = 425 \text{ nm};$$

$$T = 17\% \text{ at a wavelength } \lambda = 550 \text{ nm; and}$$

$$T = 5\% \text{ at } \lambda = 650 \text{ nm}.$$

28. The apparatus as defined in claim 14, wherein said filter is an absorption filter; and the modification in the transmittance (T) of said filter for red light across the filter surface is accomplished by way of a variation in the thickness of the filter.

29. The apparatus as defined in claim 14, wherein said filter is a filter having at least one of an interference layer and reflection layer; and the modification of the filter's transmittance (T) for red light across the filter surface is accomplished by way of a variation in a surface coverage of said at least one of the interference layer and reflection layer, applied onto the filter surface as a dot pattern in a lithography process followed by evaporative deposition.

30. An apparatus for color-neutral brightness regulation of a light source in an illumination beam path of a microscope, comprising:
   a control device configured to modify the brightness of said light source by increasing or reducing electrical power delivered to said light source;
   an optical filter placed in the illumination beam path of the microscope having a transmittance (T) for red light that changes across a filter surface, thereby causing a defined blue shift of a spectrum of light emitted by the light source; and
   a drive system for moving said filter in the illuminating beam path of the microscope,
   wherein said control device is further configured to control said drive system to move said filter in such a way that a red shift of the spectrum of the light emitted by the light source occurring upon a reduction in the electrical power delivered to the light source is compensated for by way of said blue shift caused by said filter.

* * * * *